US008780728B1

(12) United States Patent
Woodley et al.

(10) Patent No.: US 8,780,728 B1
(45) Date of Patent: Jul. 15, 2014

(54) TEST LOADING IN OFDMA WIRELESS NETWORKS

(75) Inventors: Michael Woodley, McKinney, TX (US); Jeffrey Scott, Murphy, TX (US); Jeffrey Goff, Melbourne Vic (AU)

(73) Assignee: BlackBerry Limited, Ontario (CA)

( * ) Notice: Subject to any disclaimer, the term of this patent is extended or adjusted under 35 U.S.C. 154(b) by 1111 days.

(21) Appl. No.: 12/341,790

(22) Filed: Dec. 22, 2008

(51) Int. Cl.
*H04L 12/26* (2006.01)

(52) U.S. Cl.
USPC ........... 370/241; 370/329; 370/252; 370/281; 455/67.14; 455/67.11

(58) Field of Classification Search
None
See application file for complete search history.

(56) References Cited

U.S. PATENT DOCUMENTS

| 2006/0009160 | A1 | 1/2006 | Craig |
| 2008/0160988 | A1 | 7/2008 | Jami et al. |
| 2009/0310492 | A1* | 12/2009 | Kazmi et al. .................. 370/241 |

FOREIGN PATENT DOCUMENTS

WO  2009/069083 A3  6/2009

OTHER PUBLICATIONS

3GPP TS 36.211 v8.4.0 "3rd Generation Partnership Project; Technical Specification Group Radio Access Network; Evolved Universal Terrestrial Radio Access (E-UTRA); Physical Channels and Modulation"); Sep. 2008.*
Patent Cooperation Treaty Search Report for Application No. PCT/US2009/069083, dated Apr. 14, 2010.
Ericsson, "OFDMA Channel Noise Generation for UE Tests," 3rd Generation Partnership Project (3GPP), R4-081593; TSG-RAN Working Group 4 (Radio) meeting #47bis, Jun. 16-20, Munich Germany.
Ericsson, "OCNG for UE Tests," 3rd Generation Partnership Project (3GPP), R4-082497; TSG-RAN Working Group 4 (Radio) meeting #48bis, Sep. 29-Oct. 3, 2008, Edinburgh, Scotland.
EP Examination Report dated Jun. 27, 2013.

* cited by examiner

*Primary Examiner* — Ian Moore
*Assistant Examiner* — Jackie Zuniga Abad

(57) ABSTRACT

A radio frequency radio (RF) transceiver that defines scheduling logic for generating transmission schedules for orthogonal frequency-division multiple access (OFDMA) RF transmissions from the RF transceiver, wherein the scheduling logic specifies at least one of a modulation type, a code rate, a sub-channel, and a sub-carrier for a plurality of symbols to be transmitted in a communication signal sub-frame. A processor generates outgoing data bits and outgoing test data bits for transmission from the RF transceiver as OFDMA transmission signals and OFDMA test data transmission signals, respectively, according to the transmission schedules to create loading within at least a portion of a cellular service area that corresponds with a test-loading value. The amount of the additional required loading is the difference between the test-loading value and an actual loading value.

20 Claims, 10 Drawing Sheets communication network 10 cell 52 of comm. network 50 wireless communication system 100 scheduling table 150 scheduling table 190

| scheduling parameters 98 | |
|---|---|
| starting position | symbol k+1, sub ch. index 2 |
| geometric pattern | pattern A |
| number of slots | 40 |
| periodicity | every 4$^{th}$ subframe |
| data type | random |
| count | 500 |
| test loading value | 60% |
| test data priority (rel. to data) | 2$^{nd}$ |

FIG. 10
scheduling parameters table 300

TEST LOADING IN OFDMA WIRELESS NETWORKS

TECHNICAL FIELD OF THE INVENTION

This invention relates generally to wireless communication systems and, more particularly, to testing communication devices in a wireless network that supports orthogonal frequency-division multiple access (OFDMA) transmissions.

DESCRIPTION OF RELATED ART

Wireless communication service providers, as well as Internet service providers, face some difficult challenges as communication networks are developed to work together to provide seamless end-to-end call connectivity across the various platforms. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and voice). Initially, traditional Public Switched Telephone Networks (PSTNs) were used for data transmissions. The PSTNs, however, have been largely supplanted by packet data networks, including various versions of the "Internet".

Initial wireless voice networks, including AMPS, Time Division Multiple Access (TDMA) including North American TDMA, Code Division Multiple Access (CDMA) and Global System for Mobile Communications (GSM), were used to transmit data in a limited capacity. These networks are being replaced, however, by newer wireless data-only networks, as well as data and voice networks that increasingly have greater capacity.

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, MAC layer operations, link layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, limitations are placed upon the amount of co-channel and adjacent channel interference that may be caused by transmissions on a particular channel. These limitations must therefore be tested to verify operation in accordance with requirements, regulations and/or standards.

In cellular systems, a plurality of base stations is distributed across the service area. Each base station services wireless communications within a respective cellular service area (cell). Each cell may be further subdivided into a plurality of sectors. In many cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

A new generation of cellular networks, systems and devices are being developed to enable mobile stations to receive and transmit data with increased throughput rates and capacity. For example, many new mobile stations, often referred to as mobile terminals or access terminals, are being developed to enable a user to search the Internet or to send and receive e-mail messages through the wireless mobile terminal, as well as to be able to receive continuous bit rate data, including so called "streaming data". Accordingly, different systems, devices and networks are being developed to expand such capabilities and to improve their operational characteristics. As the popularity of these devices continues to increase, the devices and networks are tested to determine satisfactory operation even during high network loading.

When new cellular communication devices, including BTSs and cell phones (mobile terminals), are developed, there often is a need, therefore, to test the new cellular communication device and/or to test the overall network operation. As mentioned before, specific operational requirements need to be satisfied as a part of introducing the new networks and/or cellular communication devices. Such operational requirements include, for example, satisfying one or more signal quality requirements notwithstanding network or channel conditions. To establish such requirements are satisfied, however, the network or communication devices need to be tested under adverse conditions that interfere with signal transmission. Such conditions typically do not exist on a continual basis and thus a delay may be realized before the required testing can take place. Accordingly, a need exists to avoid delaying test operations until the desired conditions exist testing the device or network.

BRIEF SUMMARY OF THE INVENTION

Operators and device manufacturers typically seek networks and devices that meet performance metrics (e.g., throughput, connection success, required power levels, bit error rates, etc.) for a given level of loading. Operators of networks in particular, have a need to prove their networks satisfy performance criteria under loaded traffic conditions. Thus, the embodiments of the invention provide a practical method and system for enabling an operator to prove operation of their networks without requiring the operators to deploy a plurality of mobile stations within the network to create the loading that is necessary to prove successful network operation. Generally, however, the embodiments and aspects of the present embodiments of the invention may be applied to cellular networks including packet data networks, local area networks, wide area networks, and even to mobile terminals and handsets.

A wireless communication device and method therefore includes a radio frequency (RF) transceiver that defines scheduling logic for generating transmission schedules for orthogonal frequency-division multiple access (OFDMA) RF transmissions from the RF transceiver. The scheduling logic specifies at least one of a modulation type, a code rate, a sub-channel, and a sub-carrier for a plurality of symbols across a plurality of slots of a scheduling table to be transmitted in a communication signal sub-frame. A processor generates outgoing data bits and outgoing test data bits for transmission from the RF transceiver as OFDMA transmission signals and OFDMA test data transmission signals, respectively, according to the transmission schedules.

The transmission of OFDMA test data transmission signal, which is the equivalent of transmitting actual user data using OFDMA radio technology and formats, creates loading within at least a portion of a cellular service area that corresponds with a test-loading value. Thus, a device under test can be tested in conditions that accurately simulate network loading such that the result is an increase in the system noise level generally resulting from a plurality of active users in the network in contrast to conditions that merely have high levels of interference from noise. Stated differently, data is generated and transmitted using OFDMA protocols/formats to create loading to test a network and/or device.

The wireless communication device also updates the transmission schedules to correspond with the test loading value and transmits the OFDMA test data transmission signals based on the updated transmission schedules in a plurality of adjacent cell sectors of a cellular service area as a device under test or other mobile station moves to various locations within the cellular service area. For example, a device under test or other mobile device that migrates from a first cell sector of a cell service area to a second cell sector would affect loading in both cell sectors. Accordingly, the transmission schedules are updated to correspond with changes in loading. The scheduling logic specifies, in the transmission schedules of a sub-frame scheduling table, at least one of a communication signal starting burst location and a geometric pattern of the communication signal sub-frame scheduling table for at least one of the OFDMA transmission signals and the OFDMA test data transmission signals.

BRIEF DESCRIPTION OF THE SEVERAL VIEWS OF THE DRAWINGS

A better understanding of the present invention can be obtained when the following detailed description of the preferred embodiment is considered with the following drawings, in which:

FIG. 10 is a scheduling parameters table that illustrates exemplary parameters that may be specified for use by scheduling logic or a processor when completing a scheduling table according to one embodiment of the invention.

DETAILED DESCRIPTION OF THE INVENTION

Figure 1:
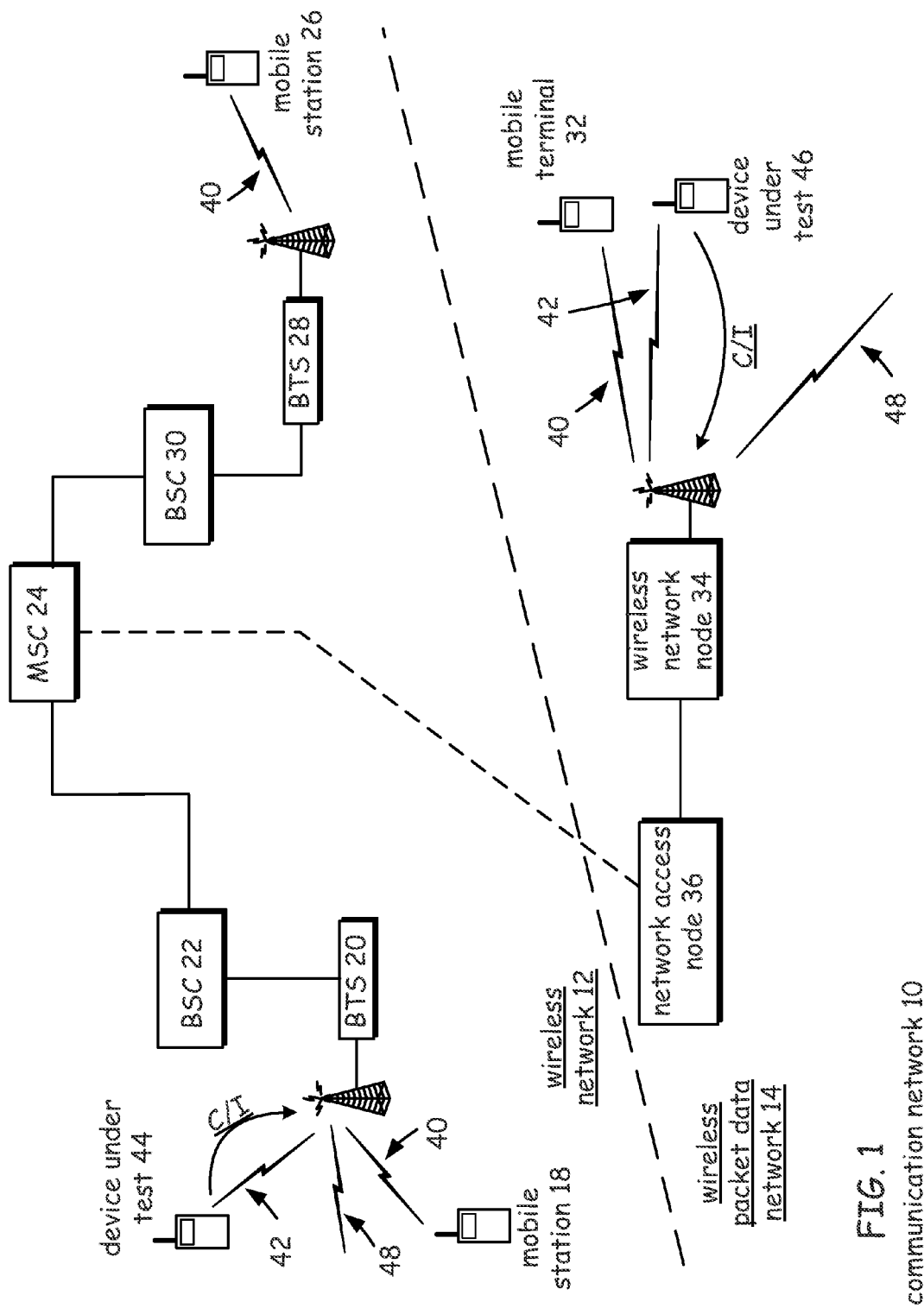
FIG. 1 is a functional block diagram of a communications network formed in accordance with the present invention.

FIG. 1 is a functional block diagram of a communications network formed in accordance with the present invention. As may be seen, communication network 10 includes mobile stations and mobile terminals that communicate over cellular network elements in a wireless network 12 and over network access nodes and wireless network nodes of a wireless packet data network 14. Generally, communication network 10 is a "cellular" network that supports voice and data calls by a plurality of handsets and mobile terminals using an orthogonal frequency division multiple access (OFDMA) radio technology. OFDMA radio technology is a multi-carrier transmission format that defines a plurality of orthogonal slightly overlapping sub-carriers to transmit multiple simultaneous signals across a wired or wireless medium. Because sub-carriers are selected to be orthogonal relative to each other, interference is eliminated even though the sub-carriers slightly overlap. The sub-carriers may be used to carry data, nulls, and pilot signals. Additionally, the sub-carriers may be used to carry binary data using binary phase shift keying modulation. The sub-carriers may also be used to carry multi-bit words using multi-bit encoding schemes, such as phase shift keying (PSK) and quadrature amplitude modulation (QAM), that substantially increase data throughput. One particular benefit of OFDMA is that digital error correction techniques such as bit interleaving may be used to distribute data across multiple sub-carrier frequencies to reduce the effects of interference.

To the extent that there are differences between orthogonal frequency division multiplexing (OFDM) and OFDMA protocols and radio technologies, the aspects and embodiments of the present invention apply to both types of protocols, radio technologies, and approaches. It should be understood that references herein to OFDMA could include OFDM where applicable or relevant. In an OFDMA communication system, data is communicated in a series of time domain bursts that carry a group of frequency domain symbols in an analog form at a specified carrier frequency prior to final amplification and propagation across a transmission medium. A receiver pre-amplifies a received RF signal (here, an OFDM/OFDMA signal), down-converts the received signal, and applies a Fast Fourier Transform (FFT) to recover the original frequency domain signals/symbols.

Wireless packet data network 14 is intended to represent newer Internet Protocol (IP) based OFDMA cellular networks that are designed to support wireless data packet transmissions for packet data sessions or data calls as well wireless local area networks that do not have the signaling infrastructure of more traditional cellular networks that support voice calls. These data calls specifically include the ability to support voice calls wherein voice information is transmitted in data packets through the packet data network 14. The wireless packet data networks 14 can comprise any type of packet data protocol network including wireless networks that utilize OFDMA radio technology such as, for example, IEEE 802.16e networks (including "WiMAX" and other variant networks), Flash-OFDM networks, 3GPP Long Term Evolution (LTE) networks, wireless broadband (WiBro) networks (South Korean telecom networks), and High Performance Radio Metropolitan Area Network (HIPERMAN) networks (European alternative to WiMAX).

At least some of these packet data networks may be deployed with overlapping wireless networks 12 to facilitate deployment of handset devices that utilize multiple communication protocols to support data packet sessions as well as voice calls. Moreover, data packet sessions are not necessarily precluded from being supported and carried over traditional wireless networks 12 that support voice calls. In general, wireless networks have evolved from merely carrying voice to being able to support communications with wireless handsets that carry both voice and data. For either application (voice or data), communication network 10 includes circuitry and logic for supporting the various aspects and/or embodiments of the present invention for creating network loading for test purposes using OFDMA radio technology.

Referring back to FIG. 1, mobile station (MS) 18 is engaged in a voice call using OFDMA radio technology over a wireless communication link with a Base Transceiver Station (BTS) 20. BTS 20 is coupled to a base station controller (BSC) 22, which in turn is coupled to a mobile switching center (MSC) 24. A mobile station 26 is engaged in a voice call with BTS 28. BTS 28 is further coupled to BSC 30 that is further coupled to MSC 24.

A mobile terminal 32 is engaged in a packet data session over a wireless communication link with a wireless network node 34, which in turn is coupled to a network access node 36. Network access node 36 is also coupled to MSC 24. Network access node 36, among other functions, acts as an interface device between wireless network node 34 and MSC 24 and performs data protocol conversions as is required. Mobile stations 18 and 26 may also engage in data sessions using any of a plurality of protocols through their corresponding BTSs 20 and 28, respectively, according to network and device capability. Thus, MS 18 may establish a packet data session with mobile terminal 32 because of the network connectivity and because of data protocol conversions supported by one or more devices including network access node 36.

MSC 24 controls calls (voice and data) routed through either BSC 22 or BSC 30 that operatively connect MS 18 or MS 26 to a call with another device in wireless network 12, or in packet data network 14 or to a landline based public switched telephone network (PSTN) telephone or data terminal. The basic operation of BTSs, BSCs, and MSCs and the other network elements and PSTNs are well known by one of average skill in the art and will not be described further here.

Generally, the link quality communications with MSs 18 and 26 and mobile terminal 32 and other similar devices in a communication network 10 may be characterized by parameters that reflect signal quality including, for example, signal-to-noise ratio (S/N), carrier-to-interference ratio (C/I), carrier-to-interference plus noise ratio (C/I+N), and signal-to-interference and noise ratio (SINR). Typically, a mobile device transmits a signal quality indication to a network access device or point in a reverse link communication (e.g., in a specified control channel signal). Network loading generally results in a limitation in RF performance or capacity due to C/I+N degradation in an OFDMA communication channel due to the impact of co-channel and adjacent channel sources of interference from forward link transmissions in other cellular service areas (e.g., adjacent cell sectors).

Network loading is often inferred, therefore, by evaluating such parameters that describe link performance in the presence of inter-cell and intra-cell interference in a cellular network or more generally, for all networks. Such interference, namely co-channel and adjacent channel interference, increase with increases in network loading. For example, the signal received by a specified mobile station or mobile terminal over the forward link from the BTS or wireless network node may contain interference from forward link transmissions in neighboring cells, in adjacent cell sectors, and in the same cell sector or local area under non-ideal operational conditions (e.g., out-of-band signals spurs). Even though the quality of a signal network signal link correlates, generally, with an amount of network loading, network loading refers, here, to a percentage of OFDMA wireless resources that are used in a sub-frame burst for a specified service area (e.g., a cell sector). Drive tests and other testing may then occur in relation to specified network loading values. Link performance is evaluated by comparing a signal quality parameter received in a reverse link communication at the base station receiver or access point or from samples of forward link signal quality collected from a device under test (DUT) in relation to the network loading.

Referring back to FIG. 1, therefore, the aggregate of forward link communications to MSs 18 and 26 and mobile terminal 32 and other similar devices will create interference for various portions of cellular service areas (cells). More specifically, forward link transmissions 40 to the MSs 18/26 or mobile terminals 32 and forward link transmissions 42 to DUTs 44/46 create network loading and associated interference that affects the forward link transmissions 42 to devices under test (DUTs) 44/46. Generally, all of the forward link communications add to loading which may create adjacent channel or co-channel interference for any one device.

One aspect of the embodiments of the present invention is that an actual loading value in a cellular network utilizing OFDMA communications is determined for an area (e.g., cell sector or other service area) surrounding a device under test such as DUT 44 or 46. For example, if twenty percent of OFDMA resources of an OFDMA Resource Block (scheduling table) are used for forward link transmissions to carry user data for delivery to one or more devices during a sub-frame burst, an actual loading value is equal to twenty percent.

In an embodiment of the invention, the network loading refers to loading within a cell sector though other areas may readily be defined for such purposes. A BTS 20 or a wireless network node 34 increases the network loading to correspond with a test loading value for the service area (cell sector or other defined area) of the corresponding DUT 44 or 46 as well as adjacent or proximate areas to create the desired loading for DUTs 44 and 46. BTS 20 or wireless network node 34 determines a required additional loading based on a difference between the actual loading value and the test loading value for the service areas of DUTs 44 and 46, respectively, to create network loading that corresponds to the test loading value.

The required additional loading is created by BTS 20 or wireless network node 34 by generating and transmitting OFDMA test data transmission signals 48 based on test data bits to supplement actual user data bits that are transmitted as OFDMA transmission signals 40 and 42. Thus, BTS 20 schedules OFDMA transmissions of OFDMA transmission signals 40 and 42 that are based on actual data bits and OFDMA test data transmission signals 48 that are based on test data bits. The OFDMA test data transmission signals 48, when combined with the OFDMA transmission signals 40 and 42, create network loading for DUT 44 service area that corresponds with the test loading value. It should be understood that the OFDMA transmission signals 40 and 42 and the OFDMA test data transmission signals 48 are transmitted in a common sub-frame as one OFDMA transmission even though they are based on actual data bits and test data bits, respectively.

While not shown explicitly herein, DUT 44 service area may be a cell sector, a cell, or other defined service area in which DUT 44 is presently located. Similarly, wireless network node 34 generates test data transmission signals 48 to create network loading for DUT 46 service area that corresponds with the test loading value. As such, DUTs 44 and 46 may be tested under desired loading conditions.

The required additional loading for a service area (e.g., cell sector) adjacent to the service area for DUT 44 may be different from a service area adjacent to the service area for DUT 46 based in part on the amount of interference from forward link wireless transmissions occurring in the service areas that are adjacent (or proximate) to the service areas of DUTs 44 and 46. Accordingly, the number of test data bits transmitted as OFDMA test data transmission signals 48 from BTS 20 may be different than from wireless network node 34 even though the test loading values being used for the service areas of DUTs 44 and 46 are equal. In the described embodiment, these "service areas" are cell sectors though the loading may be determined for a differently defined area. Additionally, even if the service areas for DUTs 44 and 46 have equal amounts of loading, the link quality for the communications with DUTs 44 and 46 may vary based on interference from other operations, multi-path interference, as well as other forms of interference.

Figure 2:
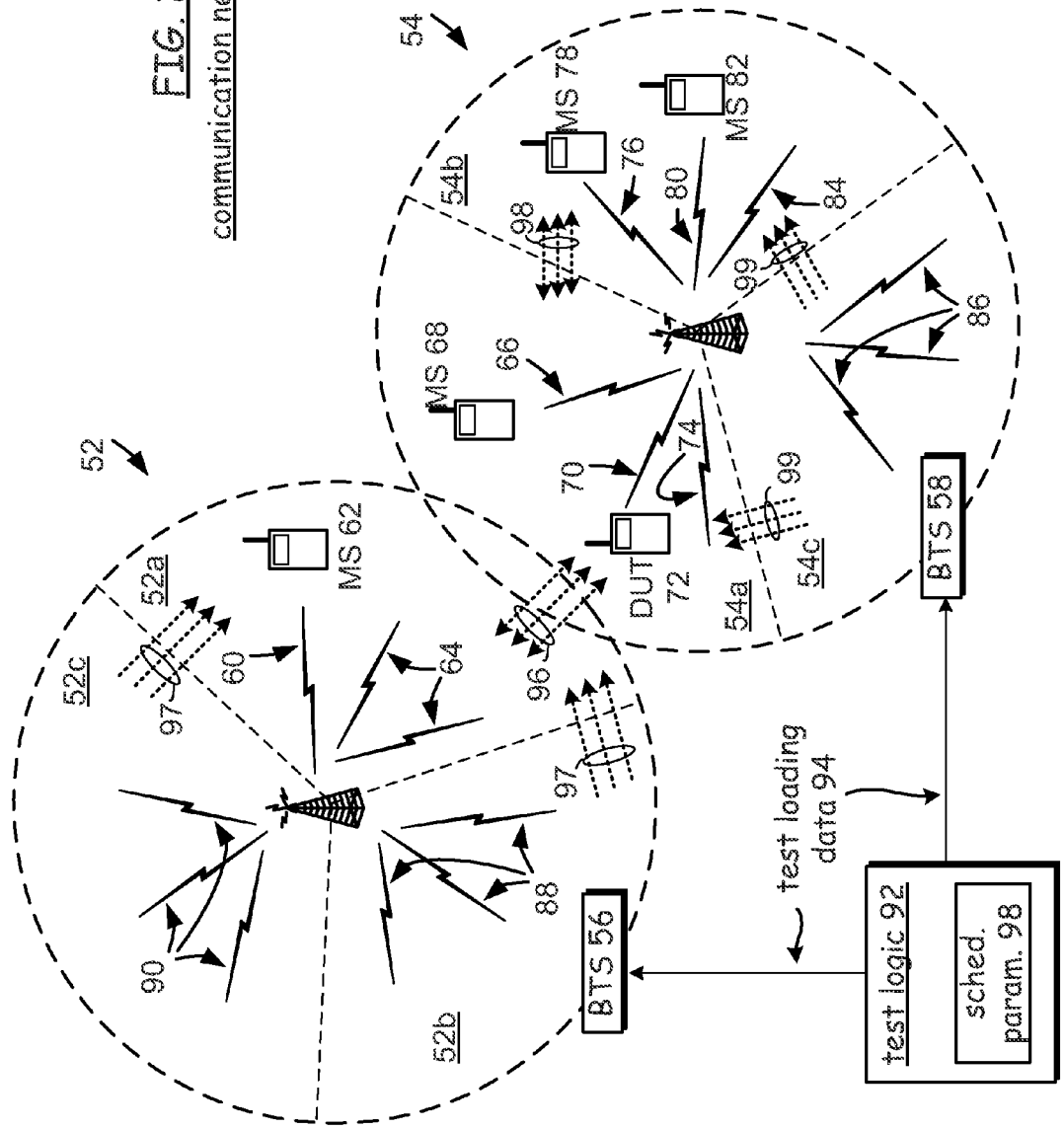
FIG. 2 is a network diagram that illustrates operation according to one embodiment of the invention.

FIG. 2 is a network diagram that illustrates operation according to one embodiment of the invention. A communication network 50 includes cellular service areas 52 and 54 (cells 52 and 54, respectively). Cell 52 includes cell sectors 52a, 52b and 52c. Cell 54 includes cell sectors 54a, 54b and 54c. BTS 56 supports forward and reverse link transmissions for cell 52 within cell sectors 52a-c while BTS 58 supports forward and reverse link transmissions for cell 54 within cell sectors 54a-c.

BTS 56 transmits OFDMA transmission signals 60 to MS 62 and OFDMA test data transmission signals 64 to create the required additional loading within cell sector 52a to correspond to the test loading value. BTS 58 transmits OFDMA transmission signals 66 to MS 68, OFDMA transmission signals 70 to DUT 72, and OFDMA test data transmission signals 74 to create the required additional loading within cell sector 54a to correspond to the test loading value. BTS 58 transmits OFDMA transmission signals 76 to MS 78, OFDMA transmission signals 80 to MS 82, and OFDMA test data transmission signals 84 to create the required additional loading within cell sector 54b to correspond to the test loading value. BTS 58 transmits OFDMA test data transmission signals 86 to create the required additional loading within cell sector 54c to correspond to the test loading value.

Here, the additional required loading within cell sector 54c is approximately equal to the test loading value since there are not any devices communicating within cell sector 54c. Similarly, within cell sectors 52b and 52c, BTS 56 transmits OFDMA test data transmission signals 88 and 90, respectively, for the required additional loading to approximately correspond to the test loading value. Alternatively, for unused cell sectors such as cell sectors 52b-c and 54c, a standard level of transmission of OFDMA test data transmission signals may be transmitted. In one embodiment, for example, a specified percentage of available OFDMA resources are allocated for cell sectors that do not have MSs or DUTs actively communicating with the cell sector.

As may also be seen, test logic 92 is coupled to transmit a test loading data 94 to each of BTSs 56 and 58. Test loading data includes at least one scheduling parameter stored in scheduling parameters table 98. Each of BTSs 56 and 58 use the test loading data 94 to determine the required additional loading, or in other embodiments, supplemental loading based on test data bits for each cell sector 52a-c and 54a-c, respectively. Required additional loading is based on actual loading within the cell sectors. Test loading data 94 may carry a test loading value, for example, or it may also carry other scheduling parameters 98 that are stored in association with test logic 92. Test logic 92 comprises, in one embodiment, circuitry that receives a user input that specifies a desired test loading value (or other test loading parameters) for a variety of tests. For example, test logic 92 consists of a central user operated test control module. As such, test logic 92 distributes the user-selected test loading data 94 to each BTS 56 or 58 that may affect testing with a specified DUT 72.

Alternately, test logic 92 may comprise logic disposed within each of BTSs 56 and 58 that specifies the test loading data 94. For this embodiment, for example, test logic 92 comprises circuitry associated with a specified BTS of BTSs 56 and 58 that receives a user specified test loading data 94 for use. The test loading data 94 may be specified for each cell or cell sector either remotely or at the cell (BSC or BTS). The test loading data 94 then is used by the transceiver system (here a BTS) to calculate the required additional loading or supplemental loading based on loading calculated in a manner defined within the BTS. Generally, the loading is created by forward link transmissions in adjacent or other cell sectors that cause interference within the cell sector that is being used to service a particular device. More specifically, inter-cell interference 96 from proximate or adjacent cells of other cells, or from intra-cell interference 99 from adjacent cell sectors within the same cell increase with increases in loading. Thus, the test loading data 94 defines OFDMA transmission scheduling parameters that create desired levels of loading and associated interference to enable link quality to be evaluated for operations under such loading conditions.

In operation, BTS 56 generates OFDMA test data transmission signals 64 to create loading that corresponds to the test loading value based on actual loading values determined for communications with one or more MSs 62 in cell sector 52a. BTS 56 generates OFDMA test data transmission signals 88 and 90 to create a standard level of loading for unused cell sectors.

BTS 58 generates OFDMA test data transmission signals 74 for the required additional loading to correspond to the test loading value based on loading for cell sector 54a. The actual interference 96, 98 and 99 in cell sector 54a is due to forward link transmissions to one or more MSs 78, 82 and 62 as well as the OFDMA test data transmission signals 84, 86 and 64 transmitted in adjacent or proximate cell sectors. Each of these MSs 78, 82 and 62 is operating in cell sectors within cell 52 or cell 54 that are adjacent or proximate to cell sector 52a.

BTS 58 generates OFDMA test data transmission signals 84 for the required additional loading to correspond with the test loading value based on actual loading within cell sector 54b. The actual interference 98 and 99 in cell sector 54b is due to forward link communications to one or more MSs/DUTs 68 and 72 (devices in adjacent cell sectors of cell 54), respectively, as well as OFDMA test data transmission signals 74 and 86, respectively. BTS 56 generates OFDMA test data transmission signals 64 for the required additional loading to correspond to the test loading value for cell sector 52a. The actual interference 96 and 97 in cell sector 52a is due to forward link communications to one or more MSs/DUTs 68 and 72 (devices in adjacent cell sectors of cell 54) and to OFDMA test data transmission signals 88 and 90 in cell sectors 52b and 52c, respectively.

Figure 3:
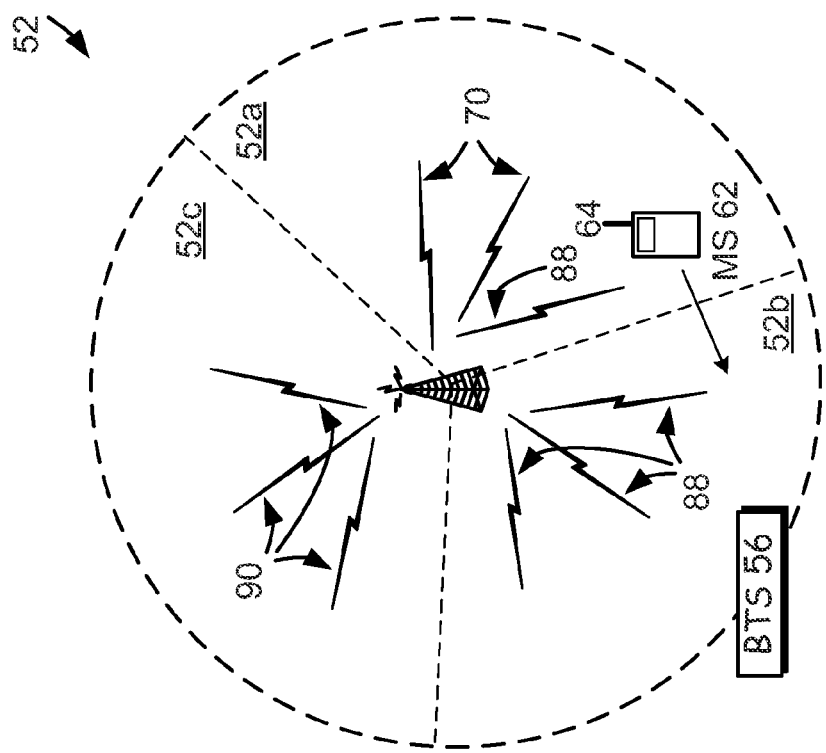
FIG. 3 is a diagram that illustrates operation according to one embodiment of the invention for a mobile station that migrates from one cell sector to another.

FIG. 3 is a diagram that illustrates operation according to one embodiment of the invention for a mobile station that transitions or migrates from one cell sector to another. Cell 52 includes cell sectors 52a, 52b and 52c and an MS 62 that is traveling from cell sector 52a to cell sector 52b. While MS 62 is within cell sector 52a, the required additional loading for cell sectors 52a and 52b is determined to create loading that corresponds with the test loading value. To maintain loading that corresponds with the test loading value, however, BTS 56 determines new required additional loading values for cell sectors 52a and 52b. BTS 56 then generates test data bits, schedules and then transmits new OFDMA test data transmission signals 88 to correspond with the required additional loading to create loading that corresponds with the test loading value for each cell sector 52a and 52b. Generally, the OFDMA test data transmission signals 88 will be increased in cell sector 52a as they are decreased in cell sector 52b.

Figure 4:
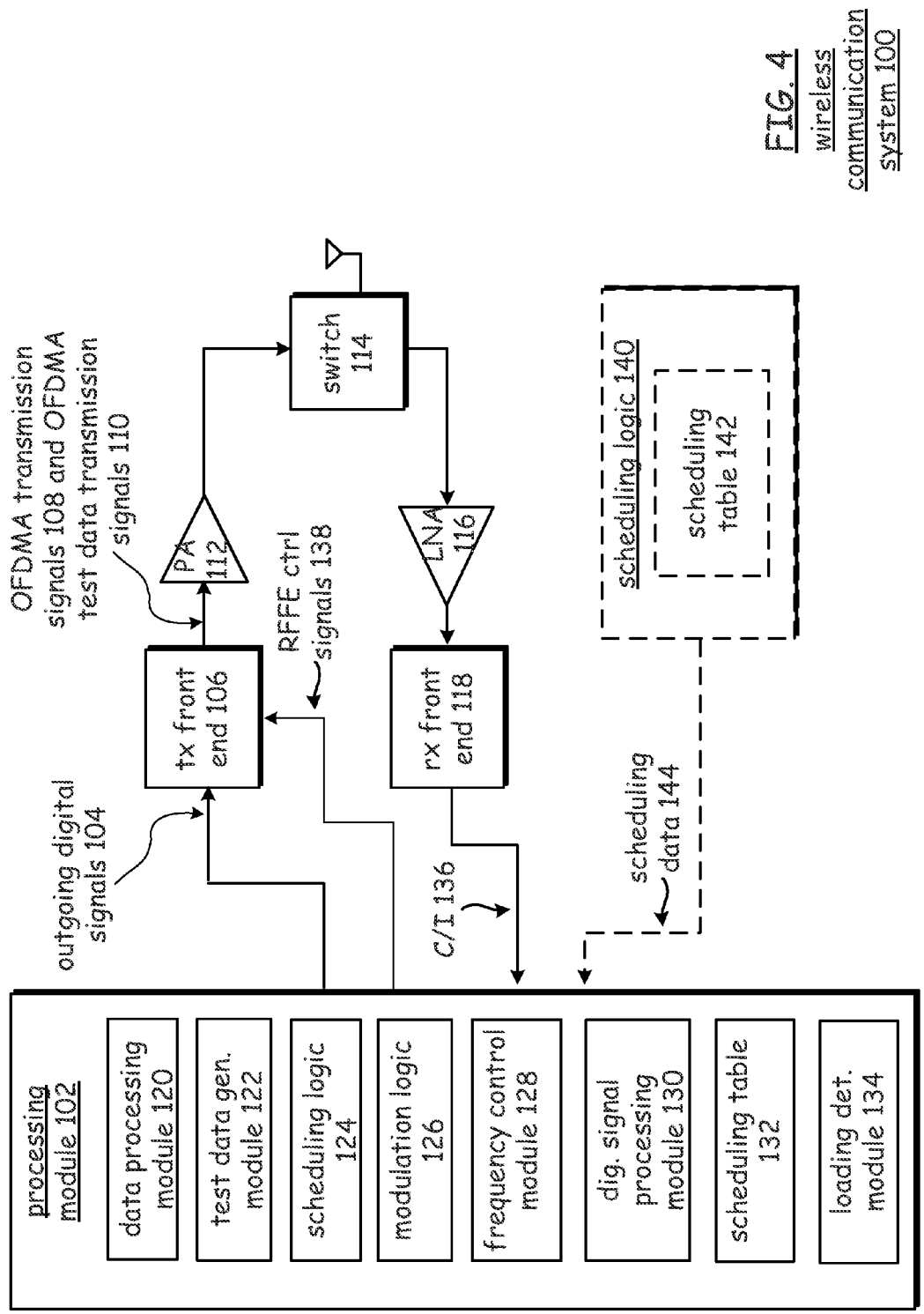
FIG. 4 is a functional block diagram of a wireless communication device according to one embodiment of the invention.

FIG. 4 is a functional block diagram of a wireless communication device according to one embodiment of the invention. Wireless communication system 100 includes a processing module 102. Processing module 102 is coupled to produce outgoing digital signals 104 to a transmitter front end 106. Transmitter front end 106 produces OFDMA transmission signals 108 and OFDMA test data transmission signals 110, based on the outgoing digital signals 104 to a power amplifier 112 that produces amplified radio frequency signals to a transmit/receive switch 114 for transmission from at least one antenna operably coupled to switch 114. It should be understood that the OFDMA transmission signals 108 and the OFDMA test data transmission signals 110 are based on the outgoing digital signals 104 are transmitted in a common sub-frame as one OFDMA transmission even though outgoing digital signals 104 are based on data signals and test data signals, respectively.

Incoming RF signals received by at least one antenna coupled to switch 114 are directed to a low noise amplifier 116. Low noise amplifier 116 produces amplified incoming RF signals to a receiver front end 118 that produces incoming digital signals to processing module 102. The incoming digital signals can periodically include a signal quality indication shown here as C/I 136. Generally, C/I 136 reflects the link quality of a prior forward link transmission. Any known signal quality indication parameter may be used herein.

Processing module 102 includes a data processing module that processes ingoing digital signals and data and produces outgoing digital data that is eventually transmitted as OFDMA transmission signals 108. Test data generation module 122 produces test data that is eventually transmitted as OFDMA test data transmission signals 110. The test data either may be a random or pseudo-random bit stream, a bit stream of logic "0" bits, a bit stream of logic "1" bits, or a repeating defined bit pattern.

Processing module 102 further includes scheduling logic 124 that schedules the OFDMA transmission signals 108 and OFDMA test data transmission signals 110. Modulation logic 126, and a frequency control module 128 perform modulation processing and frequency control and processing to correspond with modulation and frequency based parameters specified by the scheduling logic 124. The modulation processing includes generating data and digital signals to correspond with any known type of quadrature amplitude modulation (QAM) including binary phase shift-keying (BPSK), quadrature phase shift-keyed modulation (QPSK) and other quadrature amplitude modulation types including 8-QAM, 16-QAM, 32-QAM, 64-QAM, 128-QAM and 256-QAM.

The frequency control module performs channel selection and controls sample rate modifications of the digital data, etc. in accordance with the parameters specified by the scheduling logic. Frequency control module 128, in one embodiment, also generates radio frequency front-end (RFFE) control signals 138 to control frequency operations within the transmitter front end. For example, RFFE control signals 138 may specify local oscillation frequencies and/or phase-locked loop operational parameters to control an output frequency of an outgoing transmission signal. Alternatively, frequency control module 128 may specify interpolation and decimation values within the digital signal processing of processing module 102 to affect digital data sample rates and, therefore, a frequency of outgoing digital signals.

A digital signal-processing module 130 performs additional digital signal processing to improve data robustness including error correction coding and bit interleaving across various OFDMA sub-carriers. A scheduling table is filled by the scheduling logic 124 to define a map of signal transmissions characterized by OFDMA symbol identity and sub-channel indexes. The scheduling table lists, for each symbol, what sub-channel indexes and what type of modulation and a code rate for the OFDMA transmission signals and for the OFDMA test data transmission signals in one embodiment of the invention. Any parameter that affects an outgoing RF transmission signal characteristics may be included within the various embodiments of operation of the scheduling logic 124.

Accordingly, one aspect of the embodiment of FIG. 4 is that the wireless communication system 100 is operable to generate outgoing RF signals and to receive a C/I 136 from a remote transceiver to which the outgoing RF signals are being sent. Thereafter, as wireless communication system 100 increases the amount of OFDMA test data transmission signals, C/I parameters in C/I 136 will reflect a degradation in link quality that corresponds to the increase in loading as loading is increased (especially in adjacent cell sectors) to correspond with a test loading value. Typically, therefore, a specified percentage of OFDMA resources are allocated to forward link transmissions and the received C/I 136 is evaluated to gauge network and or device performance.

Wireless communication system 100 may be a transceiver system having the listed components co-located within one device or distributed over two or more separate devices. Thus, wireless communication system 100 may include the modules as shown within processing module 102 with the exception of a few modules that are placed in a separate device. As shown, for example, a scheduling logic 140 (shown in dashed lines to represent an alternate embodiment) and/or a scheduling table 142 may be formed within a remote device in place of or instead of having a module 124 disposed within processor 102. As is shown here, scheduling logic 140 transmits scheduling data 144 to processing module 102. Thus, wireless communication system 100 may be implemented within a single BTS, partially within a BTS and a BSC, within a BTS that works in conjunction with another remote device, within an access point (singularly or with a remote device), etc. In one alternate embodiment, wireless communication system 100 can comprise a mobile terminal that generates OFDMA transmission signals as well as OFDMA test data transmission signals to increase loading. It should also be noted that the structure of FIG. 4 is exemplary. The structure may readily be modified to include multiple-in multiple-out (MIMO) architectures that comprise a plurality of Tx front ends 106 and Rx front ends 118. Wireless communication devices 100 represents, therefore, any type of handheld, mobile, fixed wireless terminal, access point, wireless network node or BTS that utilizes OFDMA radio technology and performs OFDMA transmissions.

Figure 5:
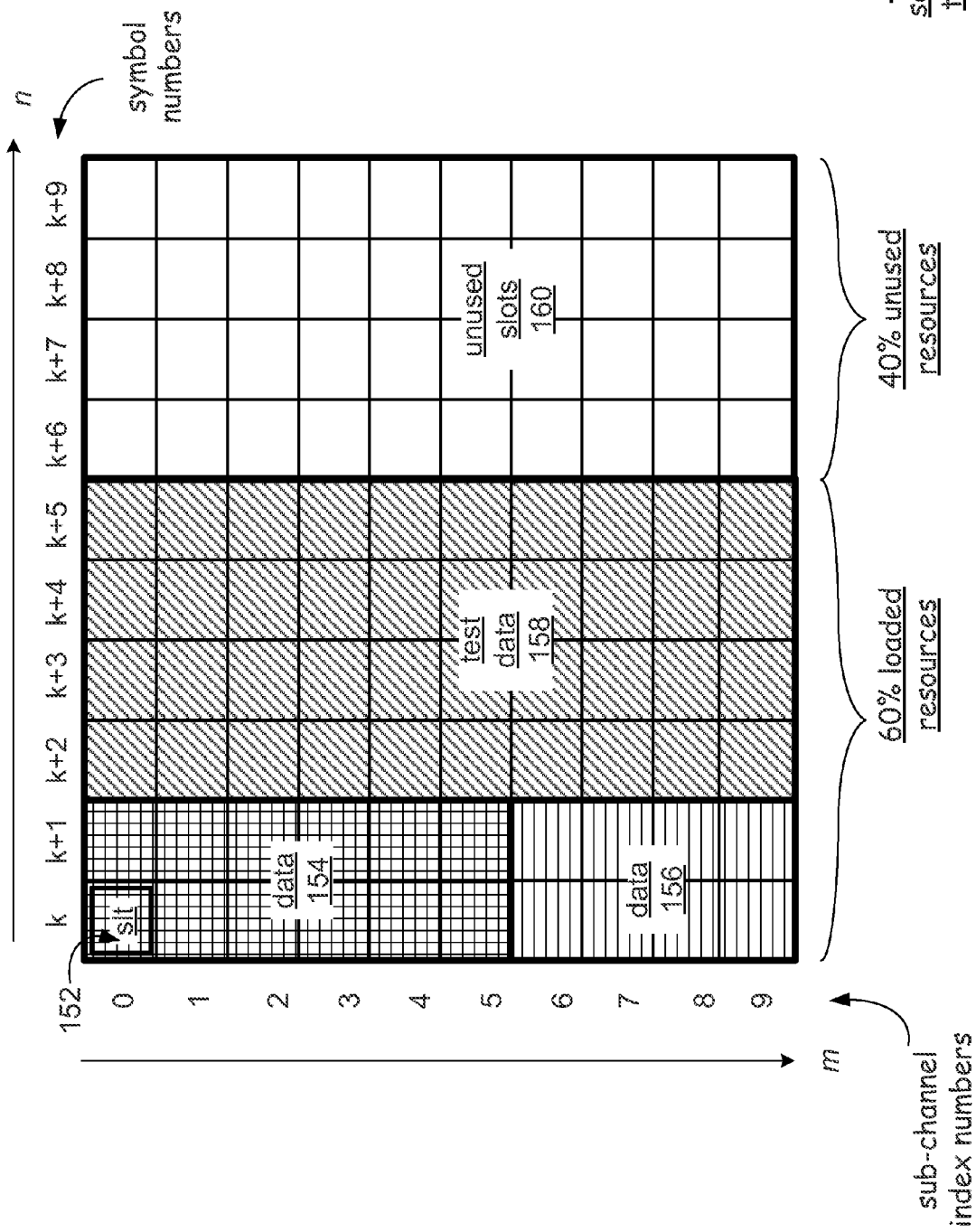
FIG. 5 is an exemplary scheduling table according to one embodiment of the invention.
Figure 9:
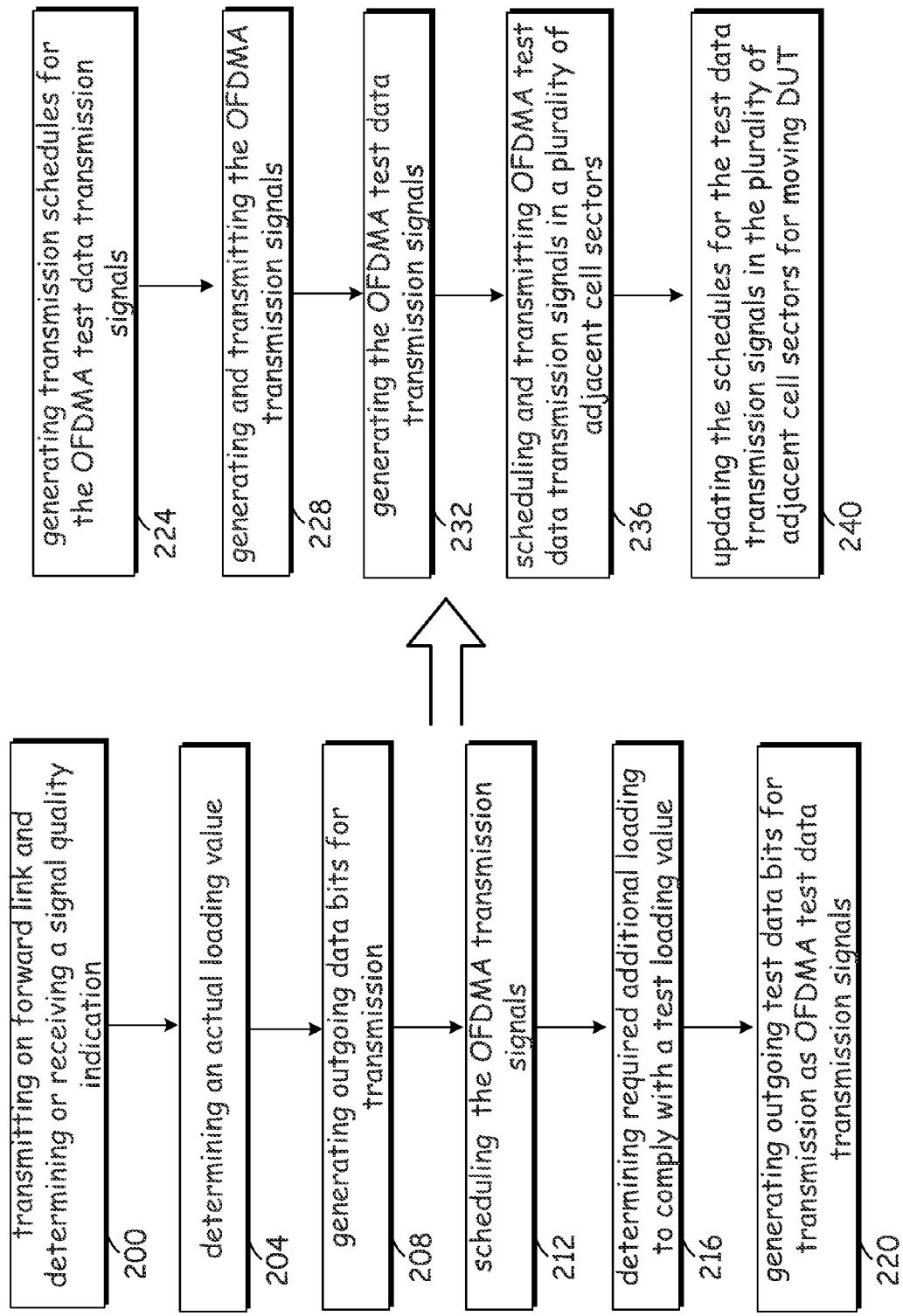
FIG. 9 is a flow chart that illustrates a method according to one embodiment of the invention.

FIG. 5 is an exemplary scheduling table according to one embodiment of the invention. Scheduling table 150 of FIG. 5 represents what is also known as a Resource Block. Scheduling table 150 defines m×n slots such as slot 152. The rows of scheduling table 150 represent sub-channel index numbers (0 to m) while the columns of scheduling table 150 represent symbol numbers (0 to n) of an OFDMA sub-frame burst. In the described embodiment, for a specified number of symbols k . . . k+n, shown in the leftmost column, a plurality of slots are defined within a sub-frame that may be identified by the various sub-channel indexes in relation to the symbols. Each slot further defines whether data, test data or control channel signaling (or nothing) is to be transmitted. For the data and the test data that is to be transmitted, a plurality of transmission parameters including, for example, a modulation type and a code rate are specified. In one embodiment of the invention, the periodicity of the data, especially for test data, may also be specified. Periodicity refers to a frequency of repetition (i.e., a repetition schedule such as every fourth sub-frame). Additionally, for the test data, a number of times that the data is transmitted may also be specified. FIG. 9 below discuss parameters that a processor or scheduling logic may use to complete a scheduling table such as scheduling table 150.

More generally, according to one embodiment, scheduling table 150 is filled according to scheduling logic (e.g., scheduling logic 124 of FIG. 4). The scheduling logic 124 may also specify a specific loading pattern for scheduling table 150. As a part of the specific loading pattern, scheduling logic 124 specifies a starting location defined by a symbol number and a sub-channel index number. For example, a starting location may be any of the slots of scheduling table 150 including slot 152. Slot 152 is identified in FIG. 5 as symbol k, sub-channel index 0. Generally, any of the m×n slots of scheduling table 150, however, may be the starting location that is specified by scheduling logic 124.

Continuing to refer to FIG. 5, scheduling table 150 defines four regions that represent outgoing OFDMA transmission scheduling. A first region that encompasses k and k+1 symbols and sub-channel indexes 0-5, labeled as data 154, reflects scheduling (transmission parameters) for OFDMA transmission signals that are to be transmitted to a first remote device. A second region that encompasses k and k+1 symbols and sub-channel indexes 6-9, labeled as data 156, reflects scheduling (transmission parameters) for OFDMA transmission signals that are to be transmitted to a second remote device. A third region that encompasses k+2 through k+5 symbols and sub-channel indexes 0-9, labeled as test data 158, reflects scheduling (transmission parameters) for OFDMA test data transmission signals that are to be transmitted within a cell or cell area (e.g., a cell sector). Finally, a fourth region that encompasses k+6 through k+9 symbols and sub-channel indexes 0-9, labeled as unused slots 160, reflects scheduling of unallocated or unused slots for a given sub-frame.

The resources allocated for these transmissions of data 154 and 156 are twenty percent of resources that can be allocated in scheduling table 150. It should be understood that a scheduling table 150 is likely to be much larger than scheduling table 150. For convenience, however, a 10×10 scheduling table 150 is shown. For the functional example of FIG. 5, and if one assumes that scheduling twenty percent of the resources defined in scheduling table 150 results in a loading value of twenty percent, and if a test loading value is equal to sixty percent, then additional required loading is equal to forty percent to create loading that corresponds to the test loading value of sixty percent. Accordingly, symbols k+2–k+5 are scheduled to transmit OFDMA test data transmission signals in all ten sub-channel indexes (0-9) shown here in FIG. 5 to create loading (total) of sixty percent.

Here, the scheduling of sub-frame resources (slots) can be said to be linear or flat. As may be seen, the transmission schedules for outgoing the OFDMA test data transmission signals sequentially follow the transmission schedules for outgoing the OFDMA transmission signals. The unused slots 160 follow the slots for data 154, 156 and test data 158. Based on the transmission schedules defined within scheduling table 150, a processing module such as processing module 102 of FIG. 4, will generate corresponding digital data that comprises actual data bits and test data bits and that are digitally processed to create outgoing digital signals. The outgoing digital signals are produced to a transmitter front end that generates outgoing transmission signals based upon the outgoing digital signals and upon RFFE control signals such as RFFE control signals 138 produced by processing module 102 for a transmission burst.

Figure 6:
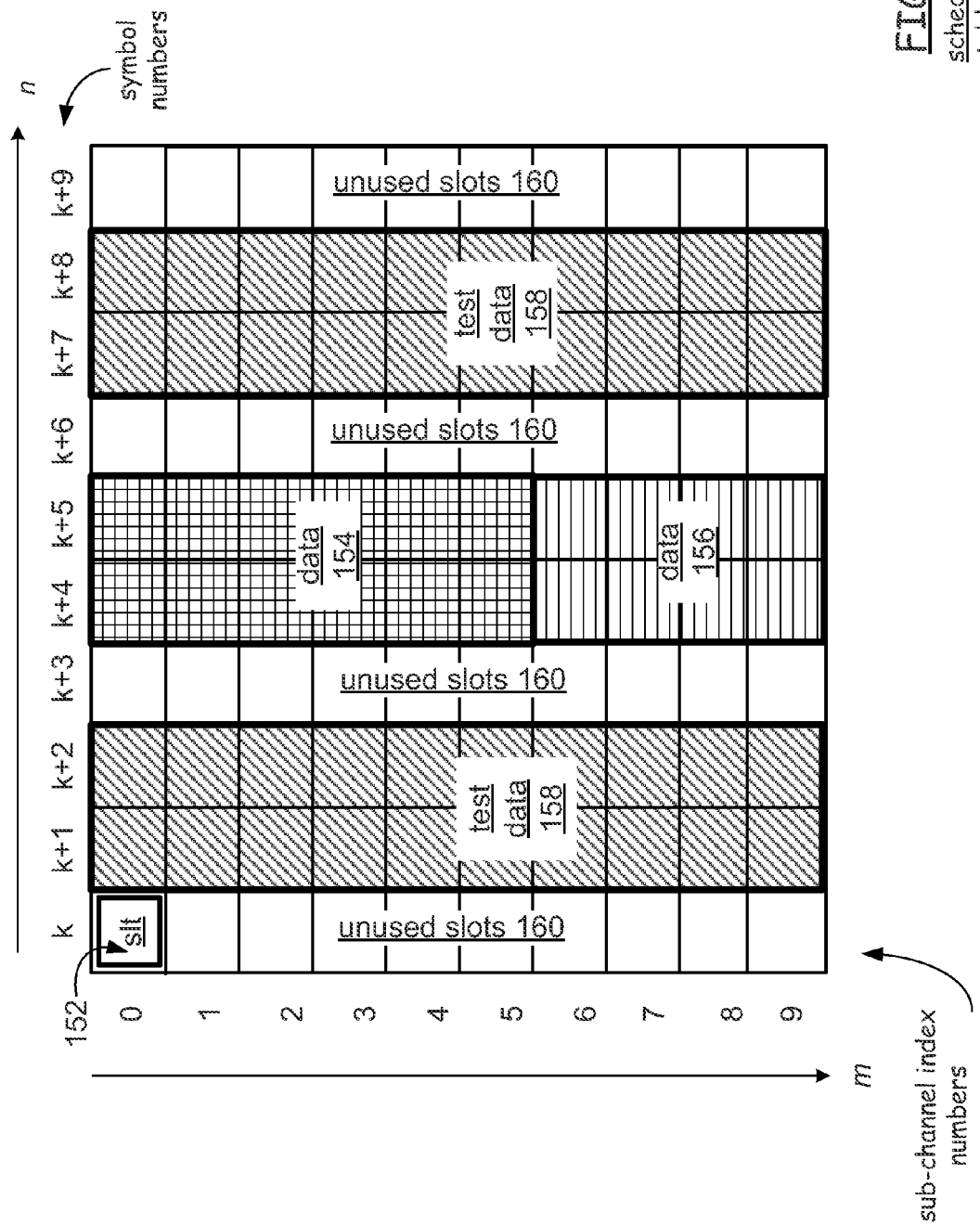
FIG. 6 is an exemplary scheduling table according to one embodiment of the invention having a geometric pattern that is not sequential.

FIG. 6 is an exemplary scheduling table according to one embodiment of the invention having a geometric pattern that is not sequential or linear in construction as described in another embodiment of this invention. Scheduling table 170, like scheduling table 150, defines loading to correspond to a sixty percent test loading value and that defines transmission schedules for the same data 154, data 156, and test data 158. The loading here for data 154 and data 156 also is twenty percent leaving a required additional loading value of forty percent that is created with the OFDMA test data transmission signals that are generated based upon test data 158. One key difference between scheduling table 170 and scheduling table 150 is the geometric pattern of the resource allocation for the transmission burst. As may be seen, data 154 and data 156 are allocated to symbols k+4 and k+5. The sub-channel index number assignments are the same. Test data 158 are allocated to symbols k+1, k+2, k+7 and k+8. Unused slots 160 are allocated to symbols k, k+3, k+6 and k+9. Thus, the different allocations are not sequential as shown for scheduling table 150.

Figure 7:
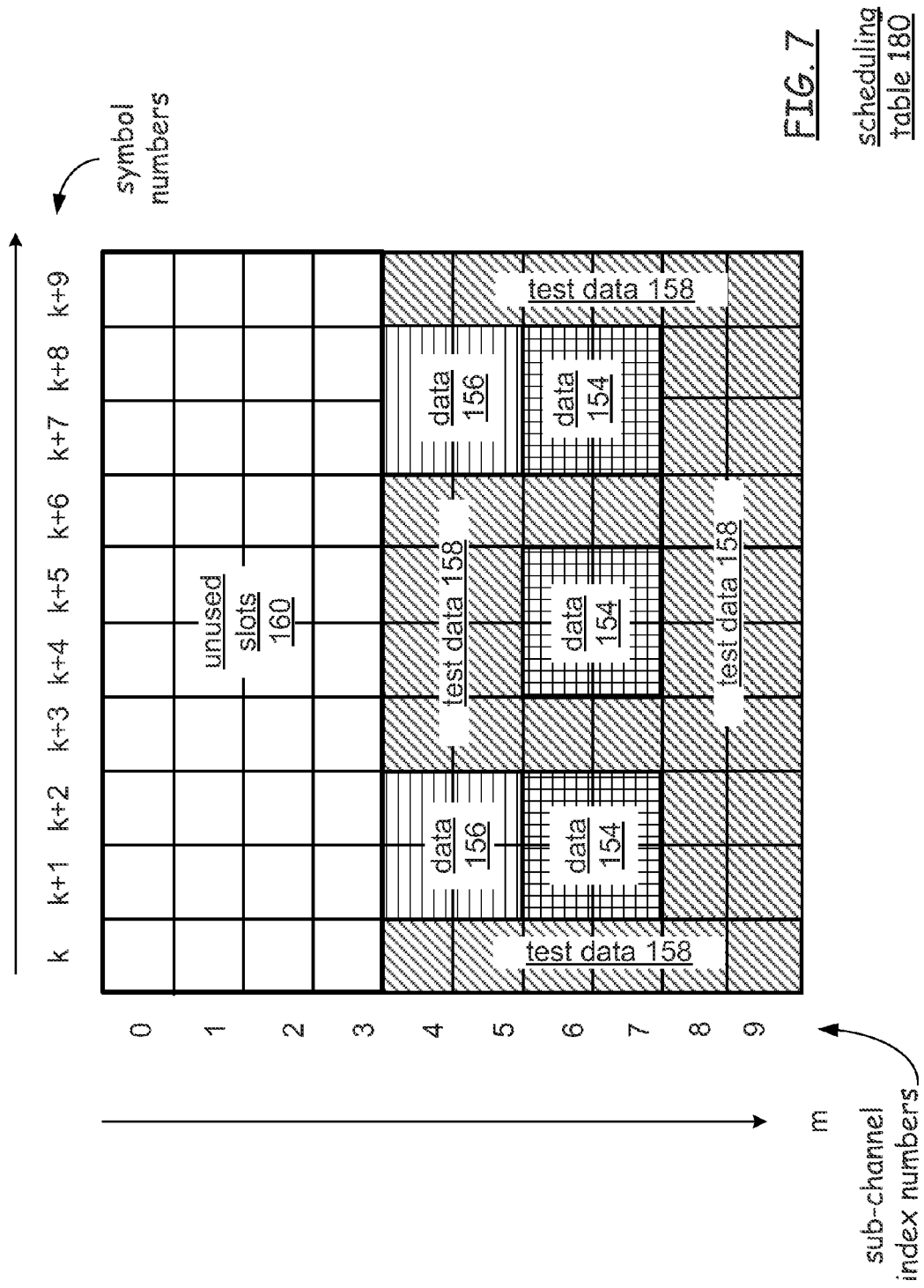
FIG. 7 is an exemplary scheduling table according to one embodiment of the invention having a geometric pattern that demonstrates a distributed but symmetric pattern.

FIG. 7 is an exemplary scheduling table according to one embodiment of the invention having a geometric pattern that demonstrates a distributed but symmetric pattern. Scheduling table 180, like scheduling table 150, defines loading to correspond to a sixty percent test loading value and that defines transmission schedules for the same data 154, data 156, and test data 158. The loading here for data 154 and data 156 also is twenty percent leaving a required additional loading value of forty percent that is established with the OFDMA test data transmission signals that are generated based upon test data 158. According to this embodiment, test data is generated and scheduled to create loading that is equal to the difference between loading for actual data for a sub-frame and a test loading value.

In an alternate embodiment, as will be discussed below in relation to an exemplary embodiment shown in FIG. 8, a specific amount of loading may be specified for transmission of test data instead of the loading for test data transmissions being a calculated value. Referring again to FIG. 7, one key difference between scheduling table 180, scheduling table 170 and scheduling table 150, is the geometric pattern of the resource allocation for the transmission burst. As may be seen, data 154 is allocated to symbols k+1, k+2, k+4, k+5, k+7 and k+8 and sub-channel indexes 6 and 7. Data 156 is allocated to symbols k+1, k+2, k+7 and k+8 and sub-channel indexes 4 and 5. Unused slots 160 are allocated to symbols k through k+9 and sub-channel indexes 0-3. Test data 158 are allocated to the remaining slots not allocated by data 154, data 156, or that are unused (unallocated slots). As may be seen, a very specific pattern is specified in scheduling table 180. One purpose of scheduling characterized by a geometric pattern similar to that shown here is to, for a specified test load value, to maximize the interference to the DUT corresponding to the test load value.

It should be noted that the geometric patterns shown above in relation to FIGS. 5, 6 and 7 are also based upon the transmission protocols that are being used for the OFDMA transmissions. More specifically, some protocols have specific requirements for allocations of the slots, for example, for supporting control channel and other overhead signaling. Such requirements may preclude the use of certain slots in a geometric pattern of a scheduling table.

Figure 8:
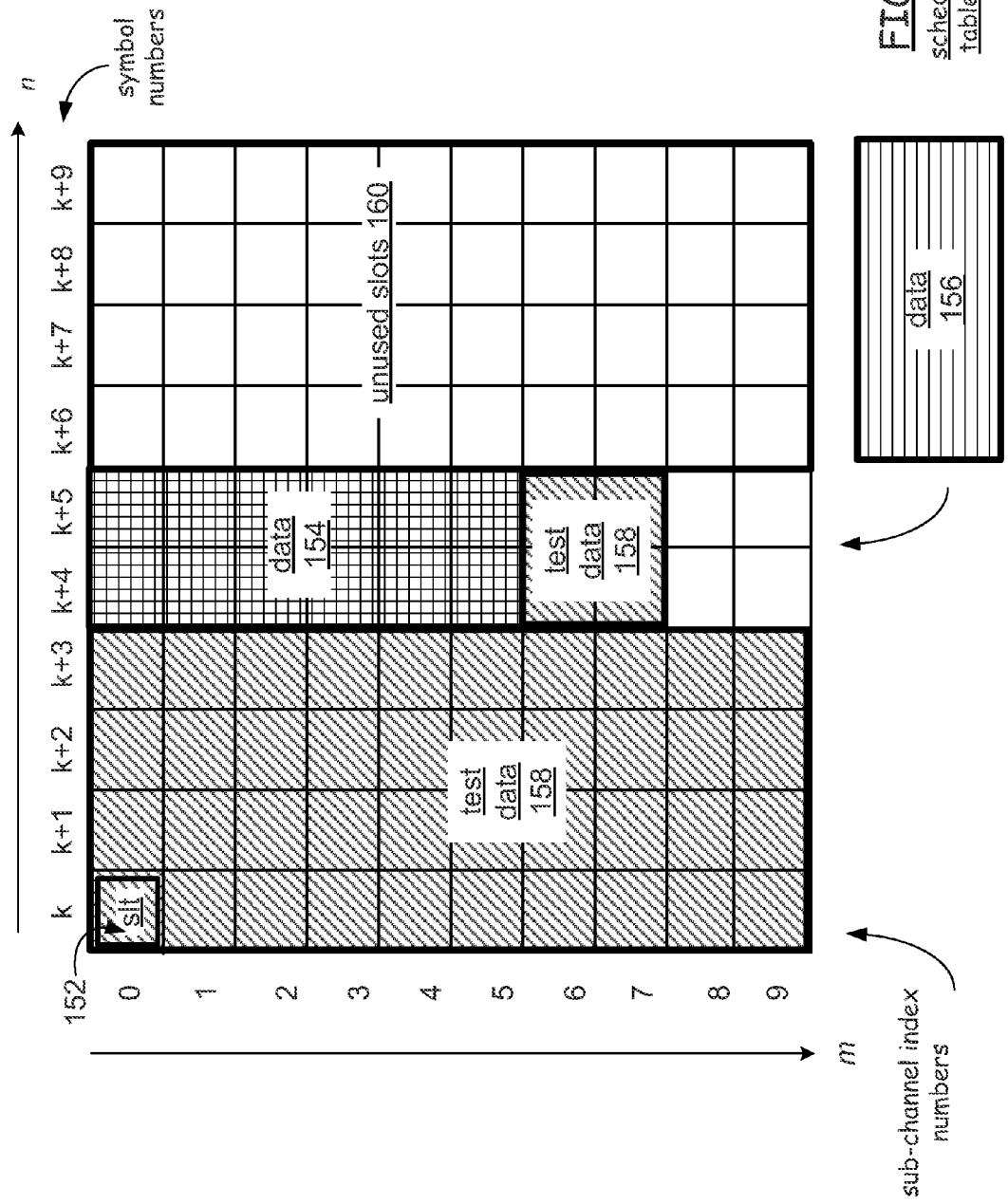
FIG. 8 is an exemplary scheduling table according to one embodiment of the invention having a geometric pattern that demonstrates a geometric pattern for transmission of test data that conflicts with transmission of actual user data

FIG. 8 is an exemplary scheduling table according to one embodiment of the invention having a geometric pattern that demonstrates a geometric pattern for transmission of test data that conflicts with transmission of actual user data. Scheduling table 190, like scheduling tables 150, 170 and 180, defines loading to correspond to a sixty percent test loading value and that defines transmission schedules for data 154 and test data 158. The loading here for data 154 and data 156, if both could be scheduled, also is twenty percent. One difference, however, is that loading for the test data is performed first and loading for data is performed second. In this example, therefore, test data is given $1^{st}$ priority and actual data is given $2^{nd}$ priority. Table 300 shown in relation to FIG. 10 below shows a field for specifying the priority of test data in relation to actual data. Additionally, loading for test data is set to a value greater than 40 percent (44 percent) here in FIG. 8 for exemplary purposes. Thus, for a test loading value of 60 percent, or more generally, for a specified total loading value of 60 percent, no more than 60 percent loading will be allowed to occur. Accordingly, there are not enough resources to schedule all of data 156. In this example, only one-half of data 156 may be allocated to available resources. Accordingly, FIG. 8 illustrates that the scheduling logic is operable, according to one embodiment, to schedule a defined geometric pattern (or loading amount) for scheduling test data in a scheduling table prior to completing the scheduling table according to other parameters.

This specific amount of loading due to the scheduling of test data may be specified either numerically or implicitly. For example, the loading may be specified implicitly based on a specific geometric pattern of OFDM resources in a sub-frame geometric table being specified or selected. For example, a plurality of geometric patterns may be defined for test data resource scheduling in a scheduling table. A selection or specification of any one of the plurality of geometric patterns for test data scheduling would have a corresponding loading effect or implicit loading value.

Scheduling logic that operates according to the example of FIG. 8 supports network and/or device operation testing in specific conditions. Having one or more defined geometric patterns that define scheduling patterns in a loading table may be beneficial for testing system operation in situations where resources cannot satisfy demand for resources for a particular sub-frame. For example, BTS operation and scheduling logic operation within a BTS or other transceiver system may be tested to demonstrate operation in specific resource limited situations. The scheduling logic is thus operable to perform scheduling to support testing that may be specified by test parameters stored in test logic.

In many of the embodiments of the invention, a test loading value is used to determine how much additional loading is to be generated based on actual loading. In the alternate embodiment in the example of FIG. 8, specified additional loading based on test data is specified implicitly by selection of a defined geometric pattern. Here, the pattern is a rectangle that consumes all resources for the first four symbols of the sub-frame and a portion of the fifth and sixth symbols. The scheduling logic schedules actual data based on remaining available resources after scheduling the specified additional loading for test data. Moreover, in this embodiment, a test loading value of 60 percent is specified, as a test parameter, in addition to the defined geometric pattern of additional loading based on test data (which is also a test parameter). Thus, an operator may evaluate scheduler performance in scheduling actual data since there are not enough resources to transmit all of data 156 in one sub-frame burst. Test parameters, for example, may be stored and specified by test logic such as test logic 92 of FIG. 2.

FIG. 9 is a flow chart that illustrates a method according to one embodiment of the invention. The method initially comprises transmitting to a mobile station or device under test (DUT) and determining or receiving a signal quality indication (step 200). More specifically, this step includes transmitting outgoing orthogonal frequency-division multiple access (OFDMA) transmission signals from an orthogonal frequency-division multiplexing capable radio transceiver. The signal quality indicator can be any known signal quality metric including but not limited to C/I, C/I+N, S/N, BER, etc.

Thereafter, the method includes determining an actual loading for a specified service area (step 204). The specified service area is, in one embodiment, a cell sector. Subsequently, the method includes generating outgoing data bits for transmission from the radio frequency (RF) transceiver as outgoing OFDMA transmission signals (step 208) and scheduling the OFDMA transmission signals for transmission from the RF transceiver (step 212). Scheduling the OFDMA transmission signals includes specifying at least one of a modulation type, a code rate, a sub-channel index, and sub-carriers for a plurality of symbols to be transmitted in a sub-frame scheduling table for a transmission burst.

The method further includes determining required additional loading to comply with a test loading value based on a difference between the actual loading value and the test loading value (step 216) and generating outgoing test data bits for transmission as OFDMA test data transmission signals (step 220). In one embodiment, scheduling logic within the RF transceiver generates the transmission schedule for data as well as test data. To transmit the test data bits, the method includes generating transmission schedules for the OFDMA test data transmission signals to correspond with the required additional loading wherein (step 224). Generating the transmission schedules for the OFDMA test data transmission signals includes specifying at least one of a modulation type, a code rate, a sub-channel, and a sub-carrier for a plurality of symbols to be transmitted in the communication signal sub-frame. Generating the transmission schedules for the OFDMA test data transmission signals may further include specifying a periodicity, a data type and a repetition number for transmission of the OFDMA test data transmission signals.

For example, a random data stream may be specified for use for the OFDMA test data transmission signals as specified by the data type. Alternately, a data stream of logic zero bits or logic one bits or a defined bit pattern may be specified. Additionally, a number of times that such OFDMA test data transmission signals are transmitted may be specified. Thus, for example, scheduling logic may specify that a transmission schedule for one or more (or even all) of the OFDMA test data transmission signals (or even specified slots) occurs a number of times (e.g., 500 times). Thus, the scheduling logic would generate a corresponding transmission signals.

Thereafter, the method includes generating and transmitting the OFDMA transmission signals based on the transmission schedules for the OFDMA transmission signals (step 228). The method further includes generating the OFDMA test data transmission signals based on the transmission schedules for the OFDMA test data transmission signals to create loading that corresponds with the test-loading value (step 232).

In addition to generating OFDMA test data transmission signals to create loading that corresponds with the test-loading value for a cell sector of a DUT, the method also includes scheduling and transmitting OFDMA test data transmission signals in a plurality of adjacent cell sectors of at least one cellular service area to satisfy the test-loading value (step 236). The adjacent cell sectors may include cell sectors of one or more cell sectors of other cell service areas. Finally, the method includes updating the schedules for the test data transmission signals in a plurality of adjacent cell sectors as a DUT or other mobile station moves (transitions) from one location to another (step 240) to maintain loading in each cell sector that corresponds with the test loading value.

It should be understood that the OFDMA test data transmission signals are orthogonal to the OFDMA transmission signals. Orthogonality of signals can include either frequency or time orthogonality, meaning that the signals are generated to not conflict with each other within a specified cell area such as a cell sector. Here, the frequencies of the signals are selected to avoid interference (e.g., frequency overlap from co-channel or adjacent channel interference).

In one embodiment of the invention, the method includes the RF transceiver or processing module of the radio transceiver varying at least one of a code rate and modulation type of the OFDMA test data transmission signals scheduled within the communication signal sub-frame. More specifically, this includes the RF transceiver or processing module (or associated scheduling logic) scheduling OFDMA test data transmissions in which the slots of scheduling table 150, scheduling table 170 or scheduling table 180, for example, have at least one transmission parameter (e.g., modulation type, code rate, power level) that varies relative to each other for a sub-frame transmission burst.

FIG. 10 is a scheduling parameters table that illustrates exemplary parameters that may be specified for use by scheduling logic or a processor when completing a scheduling table according to one embodiment of the invention. In one embodiment, scheduling parameters table 300 defines scheduling parameters that may be stored in a central device that distributes one of test loading values such as test loading data 94 in FIG. 2 or that distributes loading parameters to one or more RF transceivers (e.g., BTSs 56-58). Alternatively, scheduling parameters table 300 may be stored separately in association with each RF transceiver. Here, the parameters may be entered on site or remotely though a controlled communication link.

Referring to FIG. 10, it may be seen that typical parameters include a starting position, a geometric pattern (previously defined), number of slots of a sub-frame to be used as OFDMA test data transmission signals, a periodicity factor, a data type (e.g., random data), a count, a test loading value, and a test data priority. The starting positions may be any of the slots of a scheduling table, for example, scheduling table 150. Here, an exemplary starting position is symbol k+1, sub-channel index 2. The geometric pattern may be one of a plurality of previously defined patterns in one embodiment. Here, the geometric pattern is pattern A that is one of a plurality of defined geometric patterns. The periodicity refers to a frequency of repetition (e.g., every fourth sub-frame). The data type refers a data stream pattern of test data. For example, a data type can be a stream of random bits, logic one bits, logic zero bits, or even a defined repeating bit stream pattern. The data type thus defines the test data bit stream that is generated for transmissions as the OFDMA test data transmission signals. The count specifies how many times the OFDMA test data transmission signals will be transmitted as it relates to sub-frames and the periodicity. The test loading value is as described previously. Finally, the test data priority refers to a scheduling priority for the test data in relation to the actual user data. For some tests, it may be desirable to fill a scheduling table with OFDMA test data transmission signal transmission parameters prior to filling the scheduling table with OFDMA transmission signal transmission parameters. Here in table 300, the test data is given $2^{nd}$ priority relative to the priority given for the user data. Thus, as is described throughout the application, the user data is given first priority for scheduling and the amount of loading that is based on the test data is a function of how much actual data exists in the scheduling table for transmission.

It should be understood that table 300 is exemplary and that not all of these parameters need to be specified. Additionally, other parameters may also be used. In addition, some parameters may be mutually exclusive with others. For example, if a test loading value is specified, it may not be necessary to specify any of the patterns that relate to specific geometric patterns. Thus, table 300 can include the test loading value and not include any of burst location, geometric pattern, starting position and number of slots. Alternatively, if one or more of these parameters are included in table 300, there may not be a need for specifying the test loading value. For example, if table 300 includes a geometric pattern that has an implicit loading factor based on the geometric design, it may not be necessary to specify the test loading value if the defined geometric pattern defines resource allocations for data as well as test data. Other parameters that may be included are, for example, number of slots for a given burst, a burst number, preferred positioning of a single burst within a sub-frame. In general, table 300 reflects logic that specifies how a scheduling table is to be filled to specify transmission parameters for the transmission of OFDMA data transmission signals and OFDMA test data transmission signals.

The invention disclosed herein is susceptible to various modifications and alternative forms. Specific embodiments therefore have been shown by way of example in the drawings and detailed description. It should be understood that the drawings and detailed description thereto are not intended to limit the invention to the particular form disclosed, but on the contrary, the invention is to cover all modifications, equivalents and alternatives falling within the spirit and scope of the present invention as defined by the claims.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries may be defined as long as the certain significant functions are appropriately performed. Similarly, flow diagram blocks also have been defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof. For example, each device, server or system described in relation to the Figures in the present specification may include, in one or more embodiments, one or more of the structural elements in a configuration similar to that of device 130 of FIG. 4 to support associated operations and communications as described in relation to the various figures.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a message but may adjust its current level, voltage level, and/or power level.

As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, messages, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

What is claimed is:

1. A base station for use in a Long Term Evolution (LTE) network, comprising:
    a processor that generates outgoing data bits and outgoing test data bits;
    transceiver circuitry that transmits radio frequency (RF) signals based on at least one of the outgoing data bits and outgoing test data bits; and
    control circuitry configured to:
        determine an actual loading value within at least a portion of a cellular service area;
        determine required additional loading to comply with a test-loading value based on a difference between the actual loading value and the test-loading value;
        generate transmission schedules for outgoing orthogonal frequency-division multiple access (OFDMA) transmission signals that are based on the outgoing data bits;
        generate transmission schedules for outgoing OFDMA test data transmission signals that are based on the outgoing test data bits to correspond with the required additional loading;
        specify, in the transmission schedules for the OFDMA transmission signals and for the OFDMA test data transmission signals a sub-carrier for each of a plurality of symbols to be transmitted in a communication signal sub-frame;
        generate the OFDMA transmission signals and the OFDMA test data transmission signals;
        transmit the OFDMA transmission signals and the OFDMA test data transmission signals based on the transmission schedules for the outgoing OFDMA transmission signals and on the transmission schedules for the outgoing OFDMA test data transmission signals to create loading that corresponds with the test-loading value; and
        transmit at least a portion of the transmission schedules using a plurality of sub-channels and a subset of symbols of the sub-frame, the subset including at least the first symbol of the sub-frame,
        wherein the base station defines a specific geometric pattern in a sub-frame scheduling table for at least one of the transmission schedules for the outgoing OFDMA transmission signals and the outgoing OFDMA test data transmission signals.

2. The base station of claim 1 wherein the OFDMA test data transmission signals are orthogonal to the outgoing OFDMA transmission signals.

3. The base station of claim 1 wherein the base station determines a signal quality for a device under test.

4. The base station of claim 3 wherein the base station receives a signal quality indication from a remote wireless transceiver wherein the signal quality indication corresponds to at least one prior forward link transmission of the OFDMA transmission signals.

5. The base station of claim 1 wherein the base station varies at least one of a code rate and a modulation type for the transmission schedules for the outgoing OFDMA test data transmission signals within the communication signal sub-frame.

6. The base station of claim 1 wherein the base station generates transmission schedules for the outgoing OFDMA test data transmission signals and transmits corresponding OFDMA test data transmission signals in a plurality of adjacent cell sectors of the cellular service area of the base station transceiver system.

7. The base station of claim 1 wherein the base station specifies a communication signal sub-frame scheduling table starting burst location for at least one of the transmission schedules for the outgoing OFDMA transmission signals and the outgoing OFDMA test data transmission signals.

8. The base station of claim 1 wherein the specific geometric pattern in the sub-frame scheduling table for at least one of the transmission schedules for the outgoing OFDMA transmission signals and the outgoing OFDMA test data transmission signals simulate loading that corresponds to a defined subscriber traffic condition.

9. A method for use in a Long Term Evolution (LTE) network, comprising:
   determining an actual loading value within one of a cell service area, a cell sector, or a portion of a cell service area or a local area network service area;
   generating outgoing data bits for transmission from a radio frequency (RF) transceiver as outgoing orthogonal frequency-division multiple access (OFDMA) transmission signals;
   scheduling the OFDMA transmission signals for transmission from the RF transceiver, wherein scheduling the OFDMA transmission signals includes specifying a sub-carrier for a plurality of symbols to be transmitted in a communication signal sub-frame;
   generating outgoing test data bits for transmission as OFDMA test data transmission signals;
   generating transmission schedules for the OFDMA test data transmission signals to correspond with required additional loading wherein generating transmission schedules for the OFDMA test data transmission signals includes specifying a sub-carrier for a plurality of symbols to be transmitted in the communication signal sub-frame;
   generating and transmitting the OFDMA transmission signals based on the transmission schedules for the OFDMA transmission signal
   generating the OFDMA test data transmission signals based on the transmission schedules for the OFDMA test data transmission signals to create desired loading; and
   transmitting at least a portion of the transmission schedules using a plurality of sub-channels and a subset of symbols of the sub-frame, the subset including at least the first symbol of the sub-frame,
   wherein the network defines a specific geometric pattern in a sub-frame scheduling table for at least one of the transmission schedules for the outgoing OFDMA transmission signals and the outgoing OFDMA test data transmission signals.

10. The method of claim 9 wherein the OFDMA test data transmission signals are orthogonal to the OFDMA transmission signals.

11. The method of claim 9 further including determining a signal quality for a device under test.

12. The method of claim 9 wherein generating the transmission schedules for the OFDMA test data transmission signals includes varying at least one of a code rate and modulation type of the OFDMA test data transmission signals within the communication signal sub-frame.

13. The method of claim 9 further including scheduling and transmitting OFDMA test data transmission signals in a plurality of adjacent cell sectors of a cellular service area to satisfy the test-loading value.

14. The method of claim 13 further including updating the schedules for the test data transmission signals in the plurality of adjacent cell sectors of the cellular service area as a device under test moves from one location to another within the cellular service area.

15. The method of claim 9 further including determining required additional loading to comply with a test loading value based on a difference between the actual loading value and a test loading value.

16. The method of claim 9 further including generating transmission schedules for the OFDMA test data transmission signals prior to scheduling OFDMA transmission signals wherein loading from the scheduled OFDMA test data transmission signals and OFDMA transmission signals does not exceed a specified total loading value.

17. A wireless communication device for use in a Long Term Evolution (LTE) network, comprising:
   a radio frequency radio (RF) transceiver;
   scheduling logic for generating transmission schedules for orthogonal frequency-division multiple access (OFDMA) RF transmissions from the RF transceiver, wherein the scheduling logic specifies a sub-carrier for a plurality of symbols to be transmitted in a communication signal sub-frame; and
   a processor for generating outgoing data bits and outgoing test data bits for transmission from the RF transceiver as OFDMA transmission signals and OFDMA test data transmission signals, respectively, according to the transmission schedules;
   wherein the wireless communication device schedules transmissions of the outgoing OFDMA transmission signals and the outgoing OFDMA test data transmission signals in the transmission schedules to create loading within at least a portion of a service area that corresponds with a test-loading value,
   wherein the wireless communication device transmits at least a portion of the transmission schedules using a plurality of sub-channels and a subset of symbols of the sub-frame, the subset including at least the first symbol of the sub-frame, and
   wherein the scheduling logic specifies, in the transmission schedules, at least one of a communication signal sub-frame scheduling table starting burst location and a geometric pattern of the communication signal sub-frame scheduling table for at least one of the OFDMA transmission signals and the OFDMA test data transmission signals.

18. The wireless communication device of claim 17 wherein the wireless communication device determines a signal quality for a device under test.

19. The wireless communication device of claim 17 wherein the wireless communication device varies, in the transmission schedules, at least one of code rate and modulation type for the OFDMA test data transmission signals within the communication signal sub-frame.

20. The wireless communication device of claim 17 wherein the wireless communication device updates the transmission schedules and transmits the OFDMA test data transmission signals as a device under test moves locations to correspond with the test loading value.

* * * * *